United States Patent
Thomar et al.

(10) Patent No.: US 7,464,433 B2
(45) Date of Patent: Dec. 16, 2008

(54) WIPER BLADE TO CLEAN WINDOWS, IN PARTICULAR OF MOTOR VEHICLES

(75) Inventors: Wolfgang Thomar, Tienen (DE); Dirk Wouters, Tienen (BE); Peter De Block, Halen (BE); Olivier Janssens, Heverlee (BE); Jos Feyaerts, Winksele (BE); Roger Van den Eynde, Maasmechelen (BE); Wim Desmet, Laakdal (BE)

(73) Assignee: Robert Bosch GmbH (DE)

( * ) Notice: Subject to any disclaimer, the term of this patent is extended or adjusted under 35 U.S.C. 154(b) by 684 days.

(21) Appl. No.: 10/797,963

(22) Filed: Mar. 11, 2004

(65) Prior Publication Data

US 2005/0011033 A1    Jan. 20, 2005

(30) Foreign Application Priority Data

Mar. 21, 2003   (DE) ................. 103 12 810
Oct. 28, 2003   (DE) ................. 103 50 274

(51) Int. Cl.
 *B60S 1/38*   (2006.01)
(52) U.S. Cl. ................. 15/250.201; 15/250.43
(58) Field of Classification Search ............ 15/250.451, 15/250.201, 250.43, 250.361, 250.07
See application file for complete search history.

(56) References Cited

U.S. PATENT DOCUMENTS

| | | | |
|---|---|---|---|
| 4,152,808 A * | 5/1979 | Andregg | ................. 15/250.07 |
| 5,086,534 A | 2/1992 | Journee | |
| 6,944,905 B2 | 9/2005 | De Block et al. | |

| | | | |
|---|---|---|---|
| 2002/0053112 A1 * | 5/2002 | Ohyama | ................. 15/250.43 |

FOREIGN PATENT DOCUMENTS

| | | | |
|---|---|---|---|
| DE | 1205856 | * | 11/1965 |
| DE | 1505357 | | 5/1969 |
| DE | 2549326 | * | 5/1977 |
| DE | 19522273 A1 | | 1/1997 |
| DE | 19736368 | | 2/1999 |
| DE | 29903123 | | 8/1999 |
| DE | 10044913 | | 12/2001 |
| DE | 10036122 | * | 4/2002 |
| DE | 10120467 | * | 10/2002 |
| EP | 1232922 | | 8/2002 |
| JP | 4-108470 | * | 9/1992 |
| JP | 10-6932 | | 1/1998 |

* cited by examiner

*Primary Examiner*—Gary K Graham
(74) *Attorney, Agent, or Firm*—Michael Best & Friedrich LLP

(57) ABSTRACT

A wiper blade is proposed, which is used to clean windows, in particular of motor vehicles. The wiper blade is arranged with a rubber elastic wiper strip (24) on the one band surface (22) of a band-like, long-stretched-out, elastic supporting element (12) and can be placed on the to-be-wiped window (14). The other band surface (16) of the supporting element is covered by another component (40) of the wiper blade (10), at least in sections, and this covering part is provided with claw-like projections (54) arranged in the longitudinal direction of the wiper blade, which grip under holding edges (38) of the supporting element. A particularly tension-neutral and easily mountable wiper blade is achieved if the covering part (40), manufactured of an elastic plastic, is provided with an armoring (60) in the area of its projections (54) whose strength is greater than the strength of the plastic used for the covering part.

9 Claims, 7 Drawing Sheets

Figure 1:
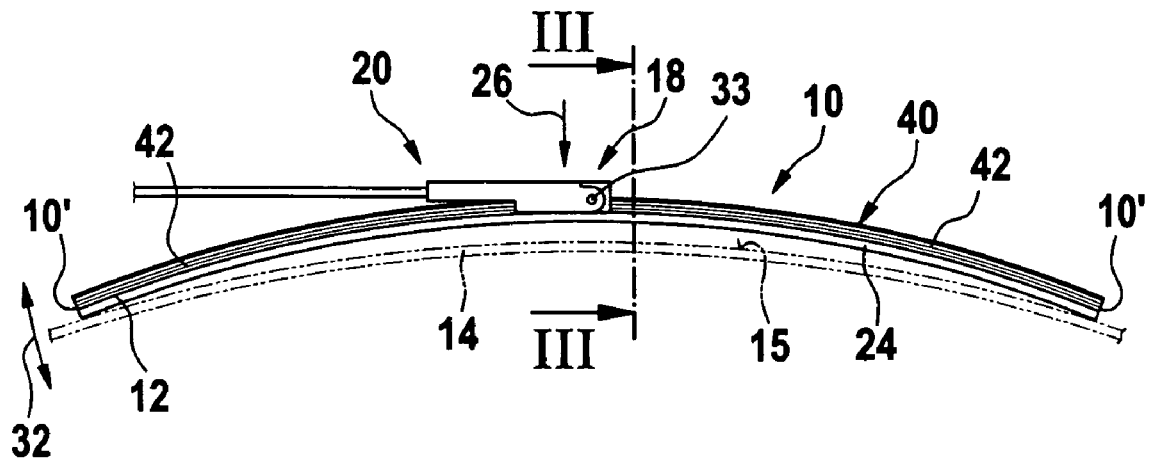

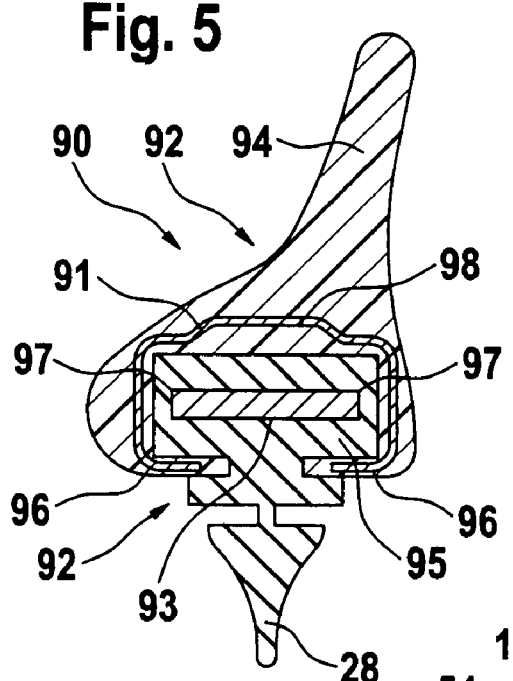
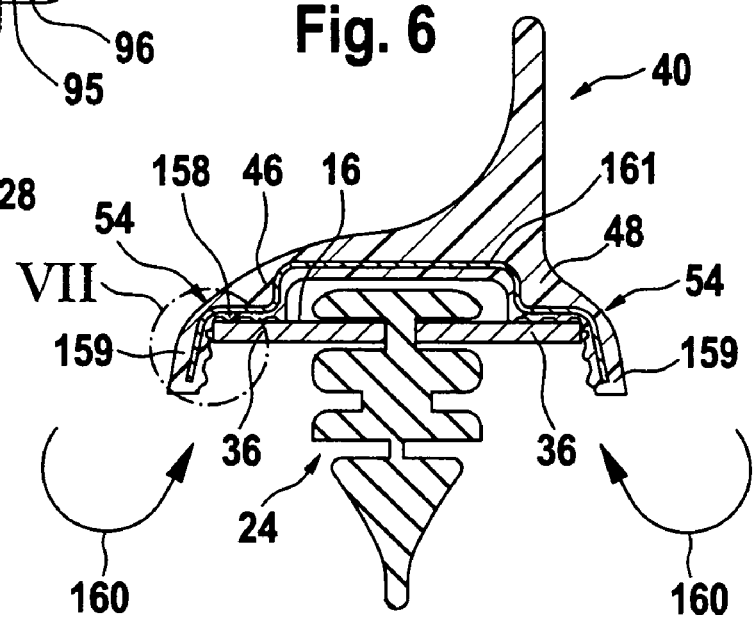
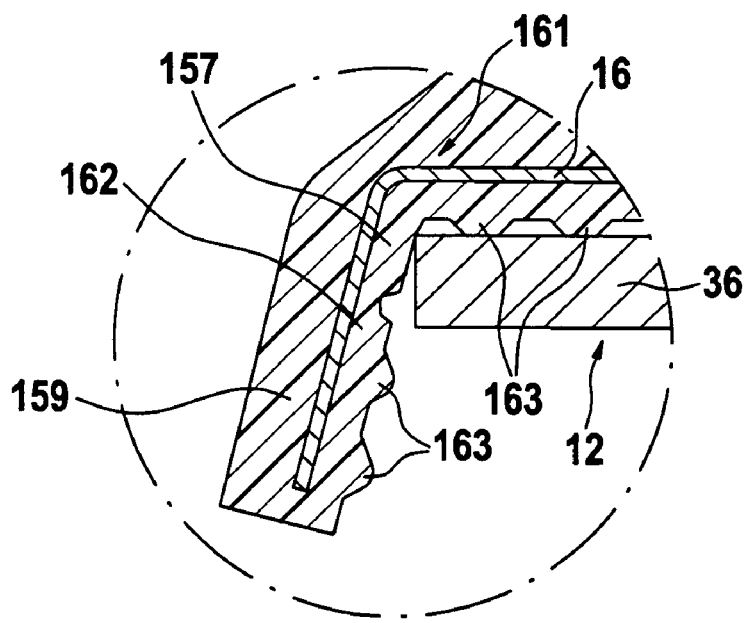

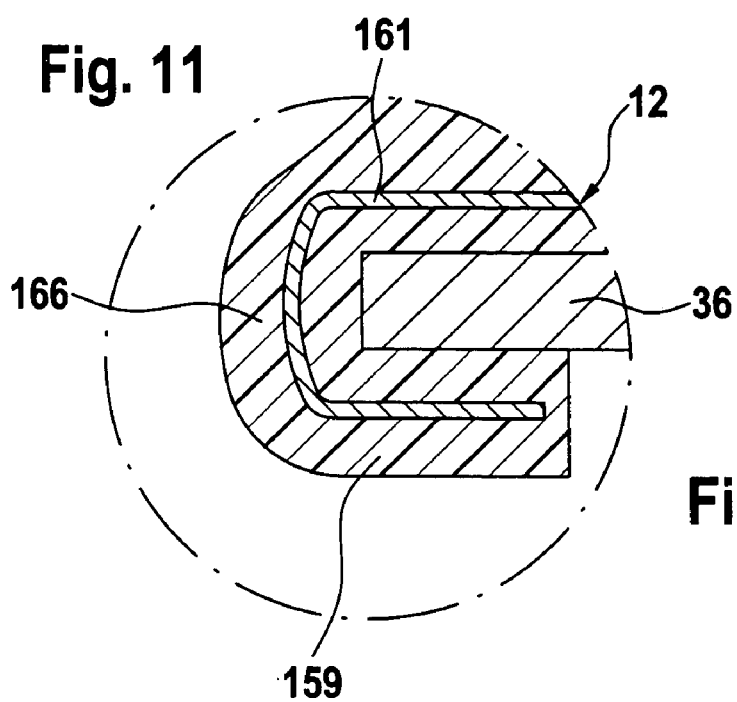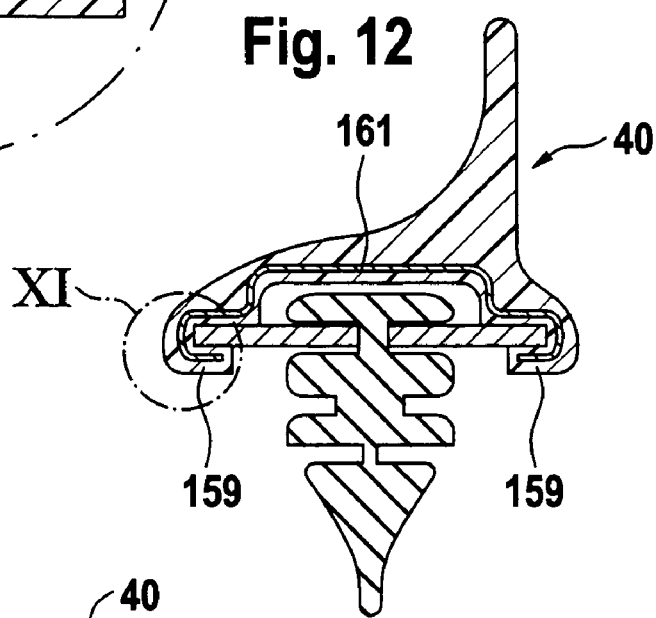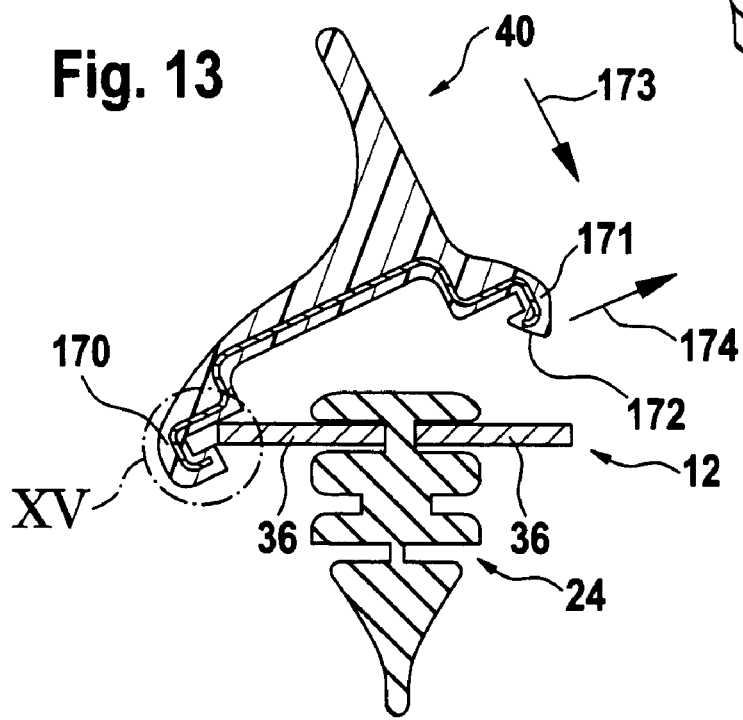

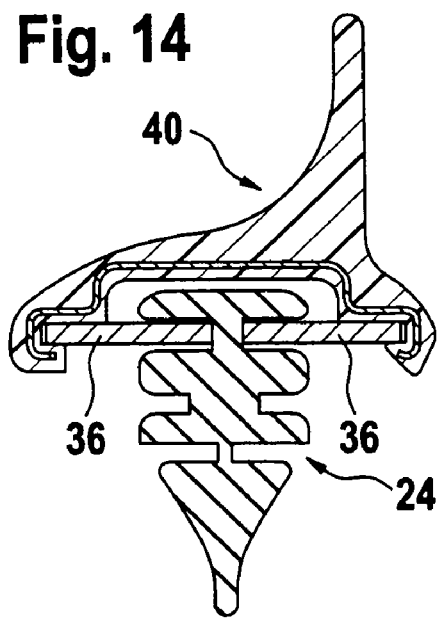
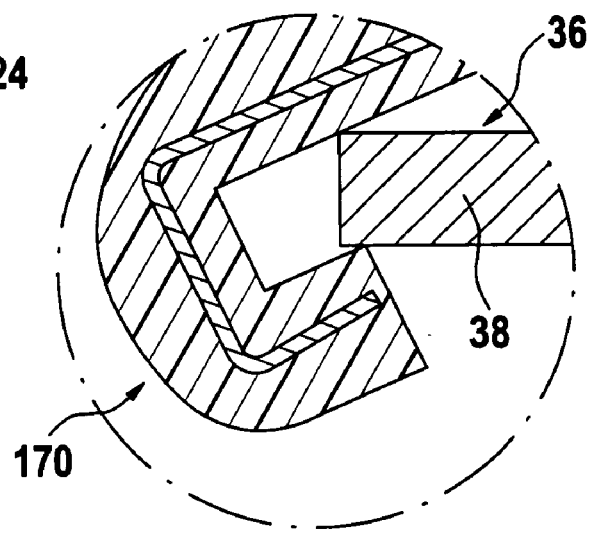
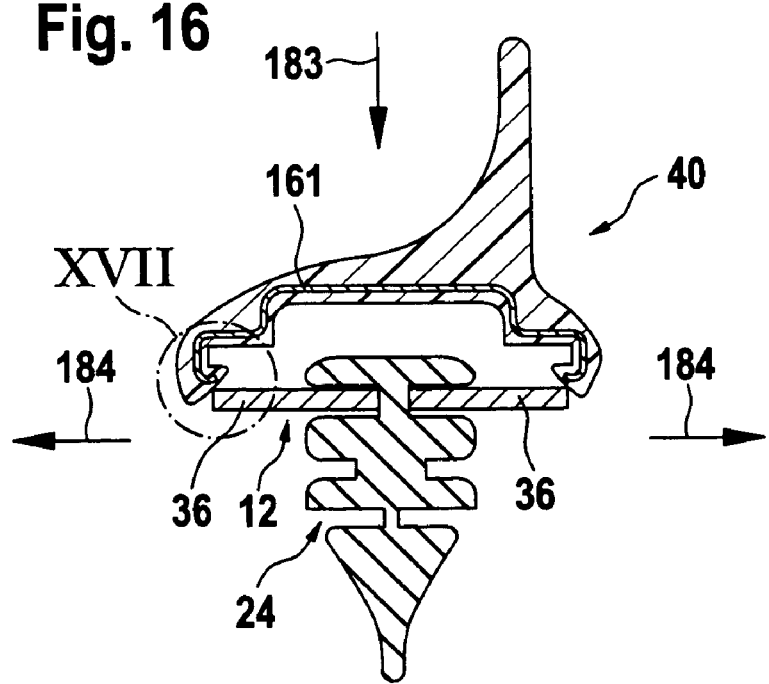

WIPER BLADE TO CLEAN WINDOWS, IN PARTICULAR OF MOTOR VEHICLES

STATE OF THE ART

In the case of wiper blades with a spring-band-like supporting element, this supporting element is supposed to guarantee the most uniform possible distribution of wiper blade pressure force originating from the wiper arm on the window over the entire wiper field being wiped by the wiper blade. Because of a corresponding shape-giving curvature of the unstressed supporting element—i.e., when the wiper blade is adjacent to the window only on its two ends—the ends of the wiper strip applied completely to the window during wiper blade operation are stressed by the then tensioned supporting element, even if the curvature radii of spherically curved vehicle windows change with every wiper blade position. The curvature of the wiper blade must therefore be somewhat greater than the greatest curvature measured in the wiper field on the to-be-wiped window, because the wiper strip, or rather its wiper lip that is adjacent to the window, must always press against the window with a specific force when the wiper is being operated. The supporting element thereby replaces the expensive supporting bracket design with two spring rails arranged in the wiper strip, as is the practice with conventional wiper blades (DE-OS 15 05 357), because, along with the distribution of the pressure force, the supporting element also effects the required transverse reinforcement of the rubber elastic wiper strip. In the case of the known wiper blade, namely the bearing force being exerted by a wiper arm onto a main bracket and directed towards the window is transferred to two claw brackets and distributed by these via four claws to the rubber elastic wiper strip. The two spring rails of this wiper blade primarily provide transverse reinforcement of the wiper strip between the claws when the wiper blade is moved over the window transverse to its longitudinal extension.

The invention starts with a wiper blade. In the case of a known wiper blade (DE 19 736 368.7 A1), the covering part arranged on the other band surface of the supporting elements is a so-called wind deflector strip, which opposes the flow-induced efforts of the wiper blade occurring at high driving speeds to lift off from the window with a force component directed to the window. For this purpose, the wind deflector strip has a front side produced in the pendulum wiper operation that is bombarded mainly by the air stream wind, which is embodied as a blade-like air-flow surface. In order to fasten the wind deflector strip on the supporting element, the wind deflector strip is provided with holding claws on its side facing the supporting element, which claws cross the outer longitudinal edges of the supporting element and grip under its band surface on the wiper strip side. One is faced with two diametrically opposed requirements when selecting a suitable material for the wind deflector strip. On the one hand, the material should not negatively affect the distribution of application force striven for via the supporting element and therefore must be relatively soft, but on the other hand the material may not be deformed impermissibly from the wind pressure acting on the wind deflector strip and therefore must possess a specific minimum rigidity. As a result, one has planned for two different materials in the manufacturing the wind deflector strip in the case of known wiper blades and these two materials are combined with each another in such a way that the required properties are intended to be achieved.

In another known wiper blade in accordance with the species (DE A1 10044913.1), an operationally reliable connection is supposed to be achieved between the wind deflector strip and the supporting element by gluing the two components to one another. This requires costly manufacturing and the adhesive connection is not able to satisfactorily meet the requirements placed on it in terms of fatigue strength in all application cases.

ADVANTAGES OF THE INVENTION

The wiper blade in accordance with the invention can be manufactured cost-effectively completely of a material whose properties do not interfere with the bearing force distribution required by the supporting element. The satisfactory and durable connection that is required in the area of the claw-like projections is produced via the armoring provided there. This armoring can be formed and dimensioned in such a way that even the forces acting on the claws and occurring with the arrangement of a wind deflector strip as a covering part can be controlled. As a result, depending upon the requirements placed on the wiper blade and the resulting properties of the material used for the armoring, the connection can, for example, be designed as a frictional clamping connection or even as a positively engaged snap-in connection. A type of soft material, for example, rubber or a thermoplastic elastomer, can, if necessary, even compensate without damage for tensions occurring in the limit area between the supporting element and the wind deflector strip if the wiper blade is wiping a windshield featuring a constantly changing curvature and then a relative movement in the longitudinal direction of the wiper blade is desired between these two components. Additional aids like the use of an adhesive can be dispensed with.

A particularly stable reinforcement of the claw-like projections is produced when the armoring is comprised of a metal.

In an embodiment of the invention that is production-related, the two holding edges of the supporting element are formed on its two outside longitudinal edges, whereby two rows of L-shaped holding claws aligned in the longitudinal direction of the supporting element are situated at a distance from one another on the underside of the covering part facing the supporting element, whose one L-leg crosses the plane of the supporting element on its longitudinal edges and whose other L-leg grips under the supporting element in such a way that these [holding claws] extend from their one L-legs towards one another, whereby the L-legs are provided with the armoring.

An advantageous stabilization of the armoring is produced if the armoring of the holding claws is embodied to be U-shaped, whereby the U-base reinforces the one L-leg and the U-shape always grips around the longitudinal edge of the supporting element. The anchoring of the holding claws forming the armoring into the covering part is thereby achieved in a second plane located above the supporting element.

In a continuation of the inventive idea, a plurality of U-shaped metal reinforcements that are a part of the covering part's armoring and are situated at a distance from another are arranged in the longitudinal direction of the covering part, whose one U-leg is always anchored in the covering part. This results in an armoring framework that is reduced in terms of weight, which does not negatively affect the flexibility of the supporting element.

A particularly simple handling of the armoring is achieved in the manufacture of the covering part if at least several of the U-legs of the reinforcements anchored in the covering part and allocated to a common longitudinal edge of the supporting element are connected to the corresponding U-legs allocated to the other longitudinal edge via bridge-like extensions that are a part of the armoring. In addition, the purposeful arrangement, shaping and dimensioning of these bridges allows influence to be had on the properties of the wiper blade with respect to its elasticity, its stability against distortion during wiper operation and also on the distribution of the bearing pressure on the window.

An additional measure, also contributes to this is an additional measure according to which at least a portion of the metal reinforcements adjoining one another in the longitudinal direction of the wiper blade are connected to one another by at least one longitudinal bridge.

If the adjoining longitudinal bridges are arranged on the U-legs anchored in the covering part, the mobility of the wiper blade over its longitudinal extension and thus the capability to adapt to changing radii of curvature of the window being wiped are completely maintained.

In a development of the invention in the case of a wiper blade whose covering part is embodied as a wind deflector strip with an air flow blade extending away from the supporting element, at least a portion of the extensions with a deformation extend into the air flow blades. As a result, a wind deflector strip composed of a very soft material can also be fastened in a purposeful manner in locations where comparably great forces act on the air flow blades without having to accept a stiffening of the wiper blade in its longitudinal direction.

In specific application cases, it has proven to be advantageous if the supporting element for the wiper strip is accommodated in a channel penetrating the wiper strip in the longitudinal direction so that its holding edges are covered by an intermediate wall of the wiper strip. Indeed in this case as well, the holding claws of the covering grip under these holding edges of the supporting element.

In another embodiment of the wiper blade, in order the connect the covering part directly to the supporting element, the supporting element features two spring rails positioned at a distance from one another and arranged parallel to one another on a common plane, whose facing longitudinal edges lie in the laterally edge-opened longitudinal grooves of the wiper strip and whose longitudinal edges facing away from one another project out of the longitudinal grooves and form the holding edges of the supporting element.

A particularly simple fastening of the covering part on the supporting element is achieved if at least the one leg of the one row of holding claws is provided with an initial bevel on its underside, which encloses an open acute angle (a) on the wiper strip side with a perpendicular line positioned on one band surface of the supporting element.

Additional advantageous developments and embodiments of the invention are disclosed in the following description of the exemplary embodiments depicted in the associated drawings.

DRAWINGS

The drawings show:

FIG. 1 A side view of a basic representation of a wiper blade in accordance with the invention.

Figure 2:
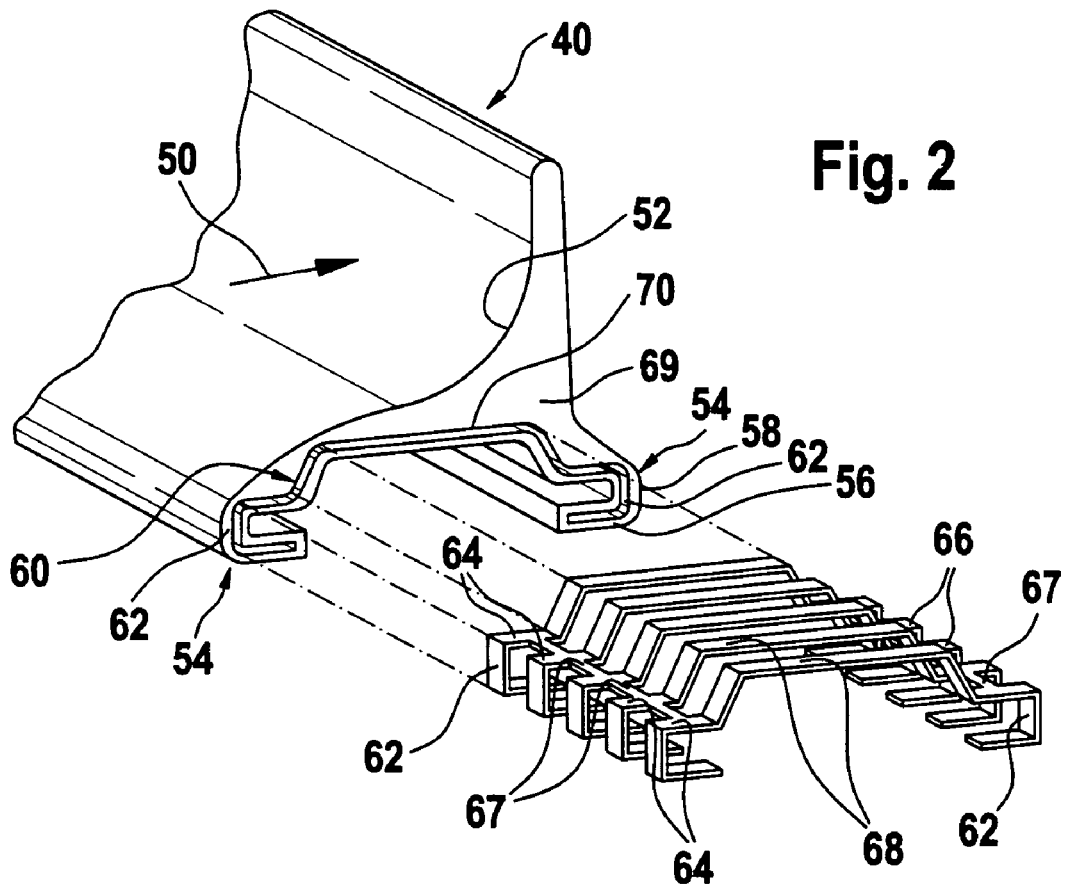

FIG. 2 A perspective, enlarged depiction of an end piece of a wind deflector strip belonging to a wiper blade with a depiction of the armoring arranged in the wind deflector strip.

Figure 3:
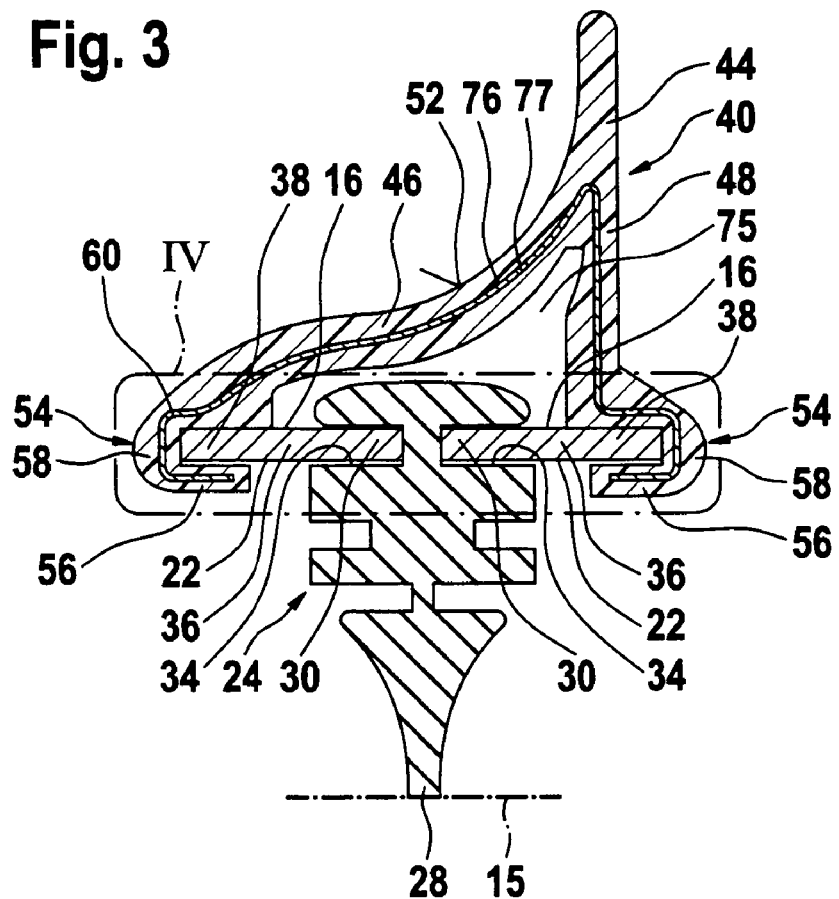

FIG. 3 A cross section through the wiper blade according to FIG. 1 along Line III-III, whereby the armoring of the wind deflector strip has a different design than in FIG. 2.

Figure 4:
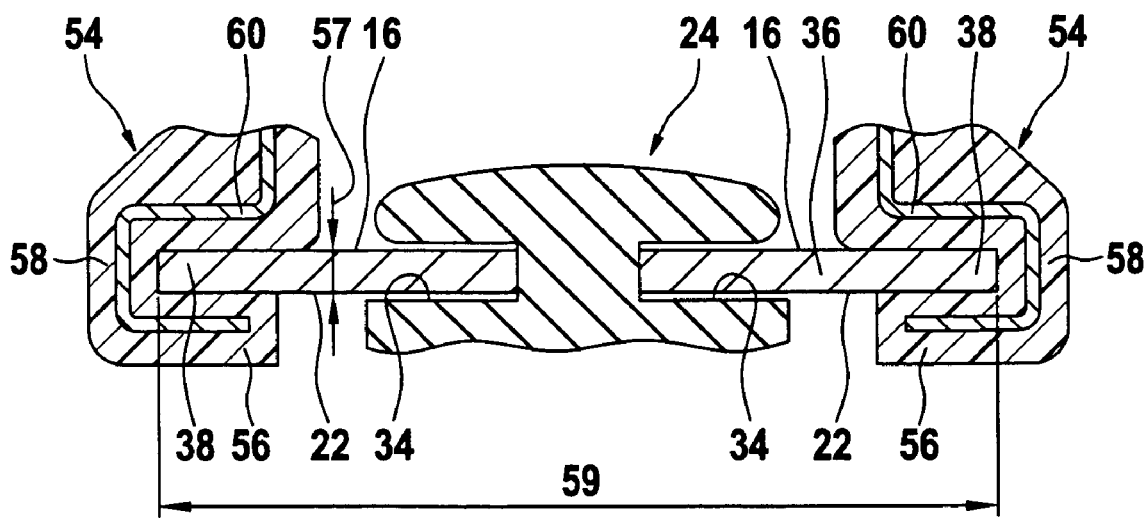

FIG. 4 An enlarged depiction of the detail designated by IV in FIG. 3.

FIG. 5 A cross section through another embodiment of the wiper blade in accordance with the invention.

FIG. 6 A cross section through a wiper blade with a still loose wind deflector strip that is embodied in accordance with FIG. 2.

FIG. 7 An enlarged depiction of the detail designated by VII in FIG. 6.

Figure 8:
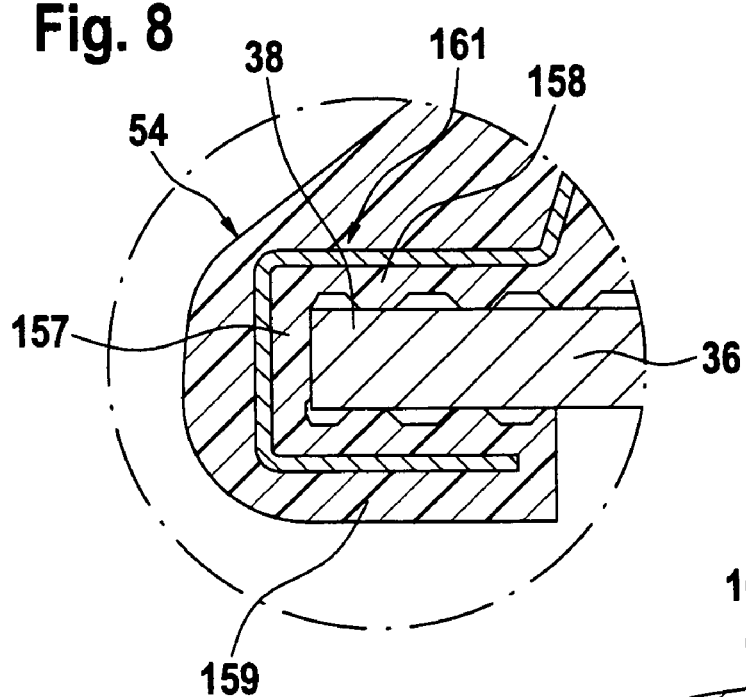

FIG. 8 The arrangement according to FIG. 7, whereby the wind deflector strip is connected to the wiper blade's supporting element.

Figure 9:
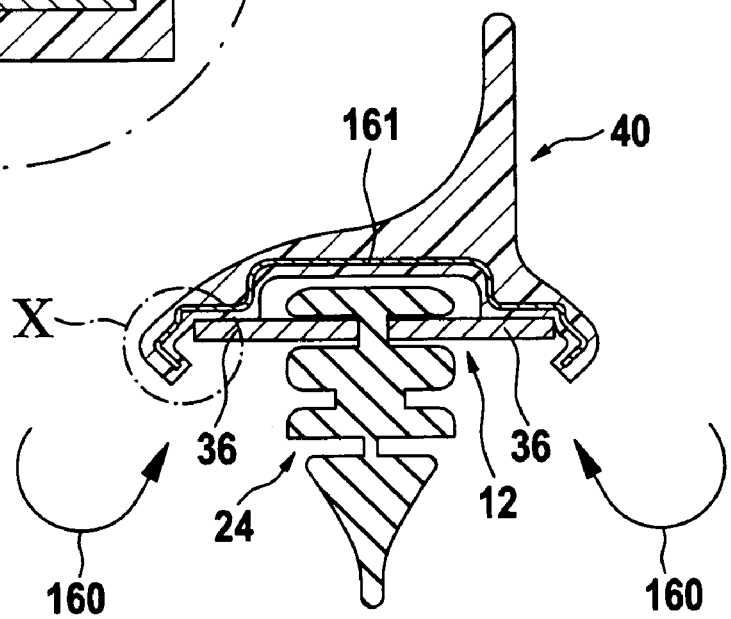

FIG. 9 The arrangement according to FIG. 6 with another embodiment of the wiper blade.

Figure 10:
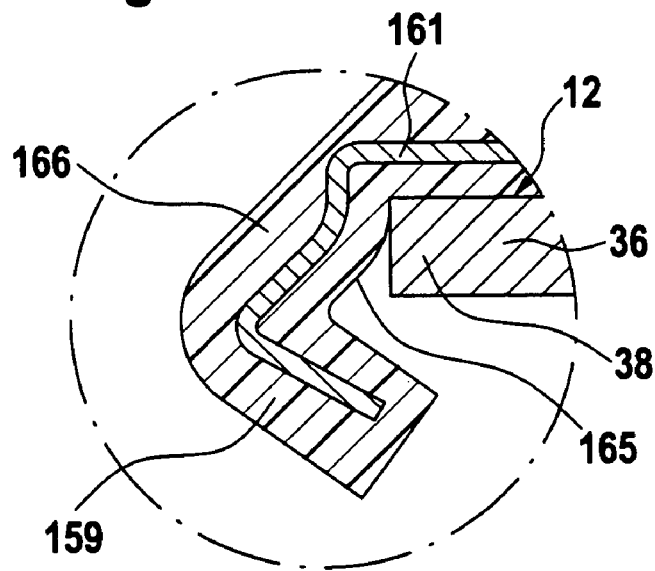

FIG. 10 An enlarged depiction of the detail designated by X in FIG. 9.

FIG. 11 The detail according to FIG. 10 when the wind deflector strip is firmly connected to the wiper blade's supporting element.

FIG. 12 A section through the wiper blade provided with the wind deflector strip in accordance with FIGS. 9 through 11.

FIG. 13 Another embodiment of the wiper blade in accordance with the invention with a wind deflector strip shown in a pre-assembly position.

FIG. 14 The arrangement according to FIG. 13 with a firmly mounted wind deflector strip.

FIG. 15 An enlarged depiction of the detail designated by XV in FIG. 13.

FIG. 16 Another embodiment of the wiper blade in accordance with the invention with a wind deflector strip shown in a pre-assembly position.

Figure 17:
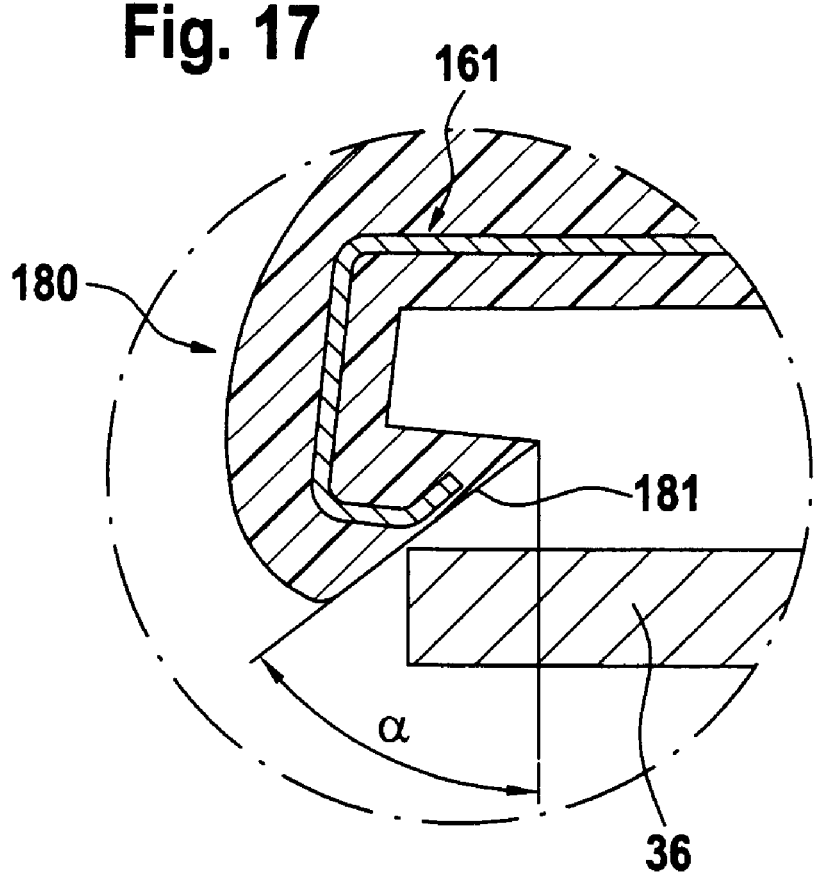

FIG. 17 An enlarged depiction of the detail designated by XVII in FIG. 16.

Figure 18:
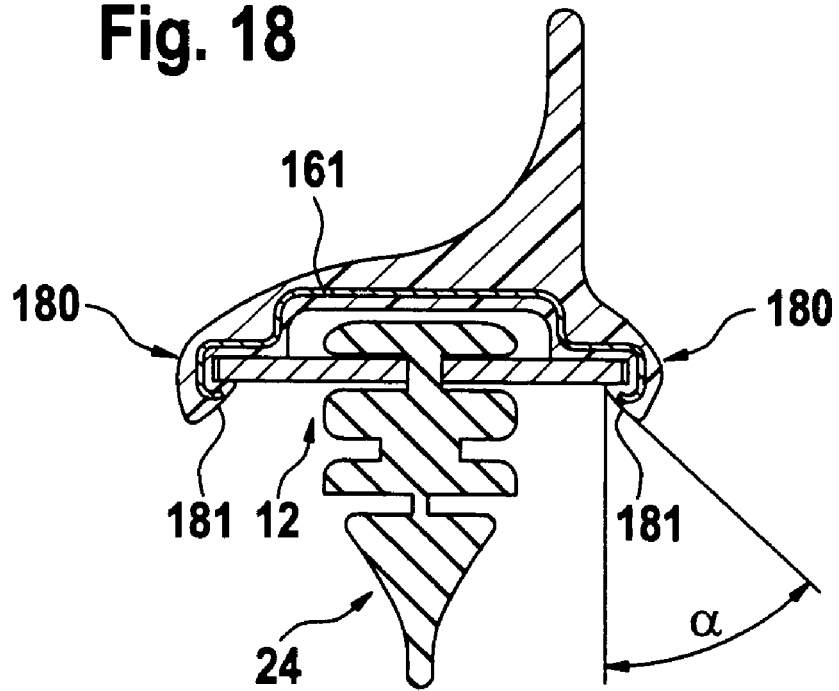

FIG. 18 The arrangement according to FIG. 16 with a firmly mounted wind deflector strip.

DESCRIPTION OF THE EXEMPLARY EMBODIMENT

A wiper blade 10 depicted in FIG. 1 features a band-like, long-stretched-out, elastic, one or two-part supporting element 12, which in an unstressed state is curved over its band surfaces in the longitudinal direction. Arranged on the convex, upper or outer band surface or band side 16 (FIGS. 1 and 3) of the supporting element facing away from the to-be-wiped window 14 in its center section is, for example, a connection device 18 flatly adjacent to this band surface, with whose aid the wiper blade 10 can be detachably connected to a driven wiper arm 20 that is guided on the body of a motor vehicle. Arranged on the concave, lower or inner band surface or band side 22 of the curved supporting element 12 is a long-stretched-out, rubber elastic wiper strip 24, which extends longitudinally axially parallel to the supporting element 12 (FIG. 3). Counter connecting means (not shown in greater detail) are provided on the free end of the wiper arm 20 and these means cooperate with the connection device 18 of the wiper blade 10 in the sense of a joint. The wiper arm 20 and thus also the wiper blade 10 are stressed in the direction of the arrow 26 towards the to-be-wiped window 14, whose to-be-wiped surface is indicated in FIG. 1 by the dashed and dotted line 15. Since the dashed and dotted line is supposed to represent the greatest curvature of the window surface, it is clearly evident that the curvature of the still unstressed wiper blade that is adjacent to the window 14 with its ends 10' is greater than the maximum curvature of the window. In other words, in an unstressed state, the wiper blade has a concave progression as compared with the window. Under the application force (arrow 26), the wiper blade 10 applies its wiper lip, 28 performing the wiping work over its entire length to the window surface 15, and goes into an operating position that approximates the extended position. In doing so, a tension builds up in the bank-like, elastic supporting element 12, which provides for the proper application of the wiper strip 24 or its wiper lip 28 over its entire length on the motor vehicle window 14. Because the as a rule spherically curved window does not represent the section of a spherical surface, the wiper blade 10 must be able to constantly adapt during its wiping motion that occurs transverse to the longitudinal extension of the wiper blade vis-à-vis the wiper arm to the respective position and the course of the window surface 14. As a result, the articulated connection between the wiper arm 20 and the wiper blade 10, which facilitates an oscillating movement (double arrow 32) around the articulated axis 33 of the connection, is required. According to the cross section of the wiper blade 10 depicted in FIG. 3, its wiper strip 24 is provided on each of its two opposing, longitudinal sides facing away from one another with a longitudinal groove 34 that is open-edged towards to the longitudinal side. The longitudinal grooves 34 extend over the entire length of the wiper strip 24, and each are used to accommodate a spring rail 36 belonging to the supporting element 12. The two longitudinal groves 34, and thus also the spring rails 36, are situated on a common plane arranged at a distance above the to-be-wiped window surface 15. Since the width of the spring rails 36 is greater than the depth of the longitudinal grooves 34, these spring rails lying in the longitudinal grooves with their facing inner edge strips 30 each project out of the longitudinal grooves 34 with their outer longitudinal edge areas or edge strips 38. Properly securing the two spring rails 36 belonging to the supporting element 12 in their longitudinal grooves 34 can be accomplished via various other components, such as via the connection device 18 or via end caps arranged on the wiper blade. In the exemplary embodiments depicted here, a two-part wind deflector strip 40 also contributes to this. The two partial pieces 42 of the wind deflector strip are arranged on both sides of the connection device 18 on the convex curved outer band side 16 of the supporting element (FIGS. 1 and 3).

As FIG. 3 shows, the wind deflector strip 40, as seen in cross section, has two legs 46 and 48 diverging from a common basis 44 that are connected to one another at this basis, and the leg 46 is provided on its outer side with a blade-like, fluted, air flow surface 52 facing the main flow direction of the air stream (arrow 50). The two legs 46, 48 with their free ends facing the window 14 support themselves on the wiper blade or on the outer longitudinal edge strip 38 of the supporting element 12. To do this, they appropriately grip at least in sections around the outer longitudinal edge strips 38 of the spring rails 36 serving as holding edges of the supporting element 12 with claws 56 embodied on projections 54. They sit, therefore, on the upper band side 16 of the supporting element 12 and each grip with their claws 56 under its lower band side 22. This thereby produces two rows of holding claws aligned in the longitudinal direction of the wiper blade at a distance from one another, and each row is allocated to a holding edge 38 of the supporting element 12. Even if each row is embodied here as one piece in a strip-like manner, i.e., there is a plurality of individual claws connected to one another without any distance, it is also conceivable to arrange several individual claws within a row at a distance from one another.

The wind deflector strip 40 is supposed to act primarily against the efforts of the wiper blade 10 to lift off from the window 14, in particular at high driving speeds. In addition, the wind deflector strip 40 covers the connection between the wiper strip 24 exerting the wiping work and the supporting element 12 distributing the application stress (arrow 26). So that the wind deflector strip 40 does not impermissibly influence the supporting element's 12 distribution of the application force, the wind deflector strip is preferably manufactured of a very elastic plastic. However, on the other hand, the projections 54 are supposed to guarantee a reliable connection to the supporting element 12 with their claws 56. These projections or their claws 56 must absorb the forces acting on the wind deflector strip and transfer [them] to the support element 12, namely during wiper blade operation, particularly when the wiping motion over the window occurring transverse to the longitudinal extension of the wiper blade is opposed to the main flow direction of the air stream 50. To do this, however, the claws must be considerably more dimensionally stable than is possible with the highly elastic material for the wind deflector strip. The two opposing requirements placed on the wind deflector strip are met in an optimum manner in accordance with the invention. Accordingly, the covering part embodied as a wind deflector strip 40 in the case of the exemplary embodiment and manufactured of a highly elastic plastic is provided with an armoring 60 in the area of its claw-like projections whose strength is greater than the strength of the plastic used for the covering part. In many cases, it might suffice if the armoring 60 only extends in the area of the projections 54 or the claws 56, because a stiffening of the projections alone frequently solves the already described problem. As can be seen in particular from FIGS. 2 and 3, two rows of L-shaped holding claws 56 aligned in the longitudinal direction of the supporting element are located on the underside of the wind deflector strip 40 facing the supporting element 12 on its projections 54 at a distance from one another, whose one L-leg 58 crosses the plane of the supporting element 12 on its longitudinal edges and whose other, claw-forming L-leg 56 grips under the supporting element in such a way that these extend from their one L-legs 58 towards one another, whereby the L-legs are provided with the armoring 60. In addition, FIGS. 2 and 3 show that the armoring 60 of the holding claws is embodied to be U-shaped, whereby the U-base 62 reinforces the one L-leg 58 and the U-shape always grips around the longitudinal edges of the supporting element that are embodied on the edge strips 38 of the spring rails 36. In doing so, the wind deflector strip 40 is adjacent over a section to the outer band surface 16 of the supporting element 12 (FIG. 4). Opposite from this, the other leg that forms the claw 56 is adjacent to the inner band surface 22 of the supporting element so that the wind deflector strip is provided on each of its ends of the legs 46 and 48 facing the supporting element with a strip-like extension that is U-shaped in cross section. The U-base of this extension is produced here from the L-legs 58 crossing the outer longitudinal edges or edge strips 38 of the supporting element 12, which L-legs turn into the two U-legs—formed by the L-legs 56 and the projections 54 of the wind deflector strip 40. The distances of the two U-legs of a row of claws from one another are adjusted to the thickness 57 of the supporting element 12 in such a way that a smooth-running, low-play, sliding guidance is produced for the supporting element in its longitudinal direction vis-à-vis the wind deflector strip 40. The distance 59 between the one L-legs 58 of the one row of holding claws to the L-legs 58 of the other row of holding claws is dimensioned in such a way that lateral jamming of the wiper strip 24 by the two spring rails is avoided. This guarantees that the wiper strip 24 is able to adapt to the continually changing curvature of the motor vehicle windshield during wiper operation in a tension-free way.

The depiction in FIG. 2 shows that a plurality of U-shaped metal reinforcements 66, which are a part of the armoring 60 and are situated in the longitudinal direction of the wiper blade at a distance from one another, are arranged in the longitudinal direction of the covering part or the wind deflector strip 40, and whose one U-leg 64 is anchored in the wind deflector strip 40. The arrangement of a plurality of metal reinforcements arranged in the longitudinal direction of the wiper blade at a distance from one another produces adequate stiffening of the wind deflector strip 40 in the area of its projections 54 and, in spite of this, permits optimal mobility of the wind deflector strip 40 fastened to the supporting element in its longitudinal direction so that the distribution of bearing force striven for via the supporting element is not disturbed. This goal is also achieved without difficulty if the neighboring metal reinforcements 66 are each connected to one another by at least one longitudinal bridge 67.

Manufacturing-related advantages in particular are achieved because of this continuation of the armoring 60. Additional advantages in this direction are achieved if at least a portion of the U-legs 64 of the reinforcements 66 anchored in the wind deflector strip 40 and allocated to a common longitudinal edge of the supporting element are connected to one another via bridge-like extensions 68 that are a part of the armoring. Arranging the longitudinal bridges 67 between the neighboring U-legs 64 only on alternating sides is also conceivable. This means that these longitudinal bridges 67 connect only two neighboring U-clasps with one another, while the connection to the next U-clasp in the other row of clasps proceeds from there. In the embodiment according to FIG. 2, the bridge-like extensions 68 are arranged close to the wiper strip 24, whereby stabilizing the wind deflector strip 40 is produced by the resulting thickening 69 in the area of the base 44 of the wind deflector strip 40.

The embodiment shown in FIG. 3 deviates slightly from the one in FIG. 2. An essential difference can be seen in that, with the embodiment in FIG. 3, the walls of the legs 46 and 48 of the wind deflector strip 40 are more strongly shaped by an inner longitudinal groove 75 extending in the longitudinal direction of the wind deflector strip. Such an embodiment has the advantage of reducing the weight of the wiper blade along with resulting multiple advantages. Of course, this can also cause an undesired weakening of the wind deflector strip. In order to effectively counter such a weakening, in the case of the embodiment in FIG. 3, the bridge-like extensions 76 with a deformation 77 extend into the leg 46 of the wind deflector strip, which leg is provided with an air flow surface 52 that is to be designated as an air flow blade. In this way, the purposeful arrangement, shaping and dimensioning of this bridge-like extension 76 allows influence to be had on the properties of the wiper blade with respect to its elasticity, its stability against distortion during wiper operation and also on the distribution of the bearing pressure on the window.

In another embodiment of the wiper blade 90 depicted in FIG. 5, the supporting element is embodied as a single spring rail 91, which is accommodated in a channel 93 penetrating the wiper strip 92 in the longitudinal direction. As a result, the outer longitudinal edges—which form holding edges for the wind deflector strip 94—are covered by an intermediate wall 95 of the wiper strip 92. Indeed also in the case of this embodiment of the wiper blade in accordance with the invention, a wind deflector strip 94 is arranged on the one band surface of the spring rail 91 and the wind deflector strip grips under the outer longitudinal holding edges of the supporting element 102 with claw-like projections 96. In this embodiment, an intermediate wall 95 formed by the wiper strip is located between the holding edges 97 of the spring rail 91 that serves as the supporting element, but this embodiment also remains within the bounds of the invention since an armoring 98, whose strength is greater than the strength of the plastic used for the wind deflector strip, is accommodated in the wind deflector strip manufactured of an elastic plastic. The armoring in this case is also preferably formed by a framework manufactured of metal, which essentially corresponds to the armoring 60 in accordance with FIG. 2. However, the shaping that deviates from FIG. 2 is adapted to the wind deflector strip 94.

Examples of the possible embodiments of the projections 54 (FIGS. 2 through 4) are depicted in the following on the basis of several exemplary embodiments. Therefore, in the case of the embodiment according to FIGS. 6 though 8, the projections 54 are first of all formed only approx. L-shaped or strip-shaped, whereby the one L-leg 158 is located in the leg 46 or 48 of the wind deflector strip 40, while the other L-leg is embodied as band strip 159. To assemble the wind deflector strip 40 on the supporting element 12, the wind deflector strip is first of all placed on the outer band side 16 of the supporting element and then the band-like L-leg 159 is bent into its final claw position (FIG. 8) in the direction of arrow 160 (FIG. 6). FIG. 7 shows that the thereby resulting U-base 161 of the armoring 160 is provided with bending markings 162 acting as target bending points, which facilitate an exact, dimensionally accurate deformation. In addition, projecting buffers 163 are embodied in the area of the resulting claws on their facing inner sides, and these buffers facilitate the securing of the wind deflector strip on the supporting element in accordance with specifications. Proper fastening of the wind deflector strip on the supporting element is guaranteed after the longitudinal walls or band strips 159 have been bent from their position in accordance with FIG. 7 into their final position in accordance with FIG. 8.

In the arrangement according to FIGS. 9 through 12, one is dealing with a modification of the embodiment described above, in which the one L-leg 166 of the longitudinal wall is provided with a crowned curvature 165 facing the outer edge strip 38 of the supporting element 12, whereby manufacturing-related advantages are achieved.

In the case of the embodiment according to FIGS. 13 through 15, ready-made, pre-formed, clevis-type claws 170 are arranged on the projections of one row, while elastically deflectable snap-in claws 171 form the other row of claws. In doing so, however, the one longitudinal side of these snap-in claws 171 is provided with an initial bevel 172 facing the outer edge strip 38 of the spring rail 36, and this bevel is used to facilitate assembly. In this case, the wind deflector strip 40 is pre-mounted in accordance with FIGS. 13 and 15, whereby the one edge strip 38 of the supporting element 12 is inserted into the claw 170 of the wind deflector strip 40 that is allocated to it. If the wind deflector strip is now rotated in the direction of the arrow 173 in FIG. 13, the already mentioned edge strip 38 goes deeper into the claw formation 170 allocated to it until the initial bevel 172 of the other claw 171 hits the other edge strip 38 of the supporting element. Due to increased pressure in the direction of the arrow 173, this claw provided with the initial bevel 172 deflects against a restoring force in the direction of the arrow 174 and the other edge strip goes into its claw-like formation 171. The result is then the assembled position as shown in FIG. 14.

In the case of the embodiment according to FIGS. 16 through 18, one is dealing with an embodiment of the design described above. However, in this case both claws 180 are embodied as snap-in claws and each is provided with an initial bevel 181 on its under side, which permits particularly simple assembly of the wind deflector strip 40 on the supporting element. To do this, the initial bevels 181 enclose an open acute angle $\alpha$ that is opened towards the wiper strip 24 with a perpendicular line 361 [sic] positioned on one of the band surfaces 16 or 22 of the supporting element 12. This also applies to the embodiment explained on the basis of FIGS. 13 through 15. For assembly, the wind deflector strip 40 is first placed on the supporting element 12, 36 in such a way that the situation depicted in FIG. 16 is the result. Due to increased pressure in the direction of the arrow 183 in FIG. 16, the two claws 180 deflect because of the initial bevels 181 in the direction of the arrow 184 so that the supporting element 12 snaps into the claws 180 with its outer edge strips 38. The deflection of the claws 180 due to the respective initial bevels 181 occurs against a restoring force, which forces the claws back into their initial positions when the supporting element 12 reaches its final position in accordance with FIG. 14 or FIG. 18 and is there snapped in.

The initially established proviso applies to all these embodiments that the striven for, pre-determined distribution of the bearing pressure by the supporting element 12 may not be negatively influenced by the covering part or the wind deflector strip. As a result, the material for the wind deflector strip 40 shall be correspondingly selected in each case to begin with. The stiffening of the claw-like projections producing the fastening to the supporting element 12 is achieved in all cases by an armoring 60, whose strength is greater than the strength of the plastic used for the covering part. It is obvious that a framework manufactured preferably of a metal is selected for the armoring. The properties of the material that is preferred from case to case are also oriented to the type of fastening that is selected in accordance with FIGS. 6 through 8, 9 through 12, 13 through 15 and 16 through 18.

The invention claimed is:

1. Wiper blade to clean windows, in particular of motor vehicles, with a rubber elastic wiper strip, which can be placed on one band surface of a band-like, elongated, elastic supporting element arranged on the window, whereby the other band surface of the supporting element is covered by a covering part of the wiper blade at least in sections and the covering part grips under holding edges of the supporting element with claw-like projections arranged in the longitudinal direction of the wiper blade, characterized in that the covering part, manufactured of an elastic plastic, is provided with an armoring in the area of its projections whose strength is greater than the strength of the plastic used for the covering part, and characterized in that the holding edges of the supporting element are formed on its two outside longitudinal edges, that two rows of L-shaped holding claws aligned in the longitudinal direction of the supporting element are situated at a distance from one another on the underside of the covering part facing the supporting element, whose one L-leg crosses the plane of the supporting element on its longitudinal edges and whose other L-leg grips under the supporting element in such a way that these holding claws extend from their one L-legs towards one another, whereby the L-legs are provided with the armoring, in that the armoring of the holding claws is embodied to be U-shaped, whereby the U-base reinforces the one L-leg and the U-shape always grips around the longitudinal edge of the supporting element, and in that a plurality of U-shaped metal reinforcements that are a part of the covering part's armoring and are situated at a distance from one another are arranged in the longitudinal direction of the covering part, whose one U-leg is always anchored in the covering part.

2. Wiper blade according to claim 1, characterized in that the armoring is comprised of a metal.

3. Wiper blade according to claim 1, characterized in that at least several of the U-legs of the reinforcements anchored in the covering part and allocated to a common longitudinal edge of the supporting element are connected to the corresponding U-legs allocated to the other longitudinal edge via bridge-like extensions that are a part of the armoring.

4. Wiper blade according to claim 3, characterized in that the covering part is embodied as a wind deflector strip, whose air flow blade extends away from the supporting element and that at least a portion of the extensions with a deformation extend into the air flow blade.

5. Wiper blade according to claim 1, characterized in that at least a portion of the metal reinforcements adjoining one another in the longitudinal direction of the wiper blade are connected to one another by at least one longitudinal bridge.

6. Wiper blade according to claim 5, characterized in that the longitudinal bridges are arranged on the U-legs anchored in the covering part.

7. Wiper blade according to claim 1, characterized in that the supporting element for the wiper strip is accommodated in a channel penetrating the wiper strip in the longitudinal direction so that an intermediate wall of the wiper strip is covered by its holding edges.

8. Wiper blade according to claim 1, characterized in that the supporting element features two spring rails positioned at a distance from one another and arranged parallel to one another on a common plane, whose facing longitudinal edges lie in the lateral edge-opened longitudinal grooves of the wiper strip and whose longitudinal edges, facing away from one another, project out of the longitudinal grooves and form the holding edges of the supporting element.

9. Wiper blade according to claim 8, characterized in that at least the one leg of the one row of holding claws is provided with an initial bevel on its underside, which encloses an open acute angle (c) on the wiper strip side with a perpendicular line positioned on one band surface of the supporting element.

* * * * *